United States Patent
Kuroki (10) Patent No.: US 8,499,650 B2
(45) Date of Patent: Aug. 6, 2013

(54) TORQUE DETECTION DEVICE FOR POWER STEERING

(75) Inventor: Masahiro Kuroki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 319 days.

(21) Appl. No.: 13/040,102

(22) Filed: Mar. 3, 2011

(65) Prior Publication Data

US 2011/0214516 A1 Sep. 8, 2011

(30) Foreign Application Priority Data

Mar. 8, 2010 (JP) ................................ 2010-050953

(51) Int. Cl.
*G01L 3/14* (2006.01)
(52) U.S. Cl.
USPC ............... 73/862.37; 73/862.33; 73/86.08
(58) Field of Classification Search
USPC .................... 73/862.37, 862.08, 862.333
See application file for complete search history.

(56) References Cited

U.S. PATENT DOCUMENTS

| | | | | |
|---|---|---|---|---|
| 3,937,104 A | * | 2/1976 | Van Gorder | 475/60 |
| 4,185,509 A | * | 1/1980 | McLarty | 475/185 |
| 5,378,179 A | * | 1/1995 | Riggle | 440/62 |
| 5,719,459 A | * | 2/1998 | Hasegawa | 310/268 |
| 7,174,795 B2 | * | 2/2007 | Feng et al. | 73/862.332 |
| 7,614,974 B2 | * | 11/2009 | Strobel et al. | 475/168 |
| 8,100,222 B2 | * | 1/2012 | Tanaka et al. | 180/444 |

FOREIGN PATENT DOCUMENTS

| | | |
|---|---|---|
| JP | 2663454 B2 | 10/1997 |
| JP | 2009-210325 A | 9/2009 |
| JP | 4382623 B2 | 12/2009 |

* cited by examiner

*Primary Examiner* — Max Noori
(74) *Attorney, Agent, or Firm* — Birch, Stewart, Kolasch & Birch, LLP (57) ABSTRACT

A torque detection device for a power steering which is less liable to be influenced by external factors or by a bending force exerted on a shaft. In the torque detection device, a torque is generated between an input shaft, which is turned interlockedly with a steering handle for operating the traveling direction of a vehicle, and an output shaft turned interlockedly with the input shaft so as to steer the vehicle. An assisting force is exerted on the output shaft by an assisting unit that is determined based on the detection result. The torque detection device is provided between the input shaft and the output shaft and includes a cam mechanism by which a torque generated between the input shaft and the output shaft is converted into a thrust force, and a pressure sensor for detecting the thrust force into which the torque is converted by the cam mechanism.

20 Claims, 4 Drawing Sheets

TORQUE DETECTION DEVICE FOR POWER STEERING

CROSS-REFERENCE TO RELATED APPLICATIONS

The present application claims priority under 35 USC 119 to Japanese Patent Application No. 2010-050953 filed on Mar. 8, 2010 the entire contents of which are hereby incorporated by reference.

BACKGROUND OF THE INVENTION

1. Field of the Invention

The present invention relates to a torque detection device for a power steering by which a handle steering force in a vehicle is assisted.

2. Description of Background Art

A torque detection device for a power steering is known that includes a device wherein an input shaft and an output shaft are mounted a turnable manner and are elastically coupled to each other through a torsion bar. A torque amount is detected based on the torsion amount of the torsion bar. See, for example, Japanese Patent No. 2663454 and Japanese Patent No. 4382623.

In addition, a torque detection device for a power steering is known that includes a pair of magnetostrictive films formed at the outer periphery of a shaft so as to have magnetic anisotropy in opposite directions. An excitation coil and a detection coil surround the outer periphery of each of the magnetostrictive films, wherein variations in magnetic permeability of the pair of magnetostrictive films varied according to torsional deformation of the shaft are detected based on variations in AC resistance of the excitation coil and the detection coil, whereby the torque inputted to the shaft is detected. See, for example, Japanese Patent Laid-open No. 2009-210325.

The device described in Japanese Patent No. 2663454 has difficulties in that it needs a planetary gear mechanism for the detection of torque and its structure is complicated.

A torque sensor part (7b) in the device described in Japanese Patent No. 4382623 is so configured that a difference in the rotation angle between an input shaft (704) and an output shaft (705), or strain, generated due to a resistance of a front wheel part or the like is caused to occur in a reduced diameter part of a torsion bar (709) interconnecting the input shaft (704) and the output shaft (705). In addition, a difference in the rotation angle between a first tie rod (708) interlocked with the input shaft (704) and a body to be detected (712) interlocked with the output shaft (705) is detected by use of the ring-shaped to-be-detected body (712) provided with sensing slits or the like ranging along the circumferential direction and a sensing coil (713), and, as a variation in voltage, the detection result is outputted as a signal (torque amount) inclusive of information on the turning direction of the input shaft (704). Therefore, the device has difficulties in that it is susceptible to the influences of external factors (for example, the influences of variations in the road surface or the like, not due to the driver's steering).

The device described in Japanese Patent Laid-open No. 2009-210325 has difficulties in that, when a bending force is exerted on a shaft, the device is susceptible to the influence of the bending force, since the device adopts a magnetostrictive type torque sensor for detecting a torsional strain of the shaft.

SUMMARY AND OBJECTS OF THE INVENTION

Accordingly, a problem to be solved by the present invention is to provide a torque detection device for a power steering device which is not complicated in structure and which is less susceptible to influences of external factors or an influence of a bending force exerted on a shaft.

In order to solve the above-mentioned problem, according to an embodiment of the present invention, there is provided:

a torque detection device for a power steering, operable to detect a torque generated between an input shaft, which is turned interlockedly with a steering handle for operating a traveling direction of a vehicle, and an output shaft turned interlockedly with the input shaft so as to steer a wheel or wheels, the detection result being used to determine, on the basis thereof, an assisting force to be exerted on the output shaft by an assisting unit, the torque detection device includes:

a cam mechanism which is provided between the input shaft and the output shaft and by which the torque generated between the input shaft and the output shaft is converted into a thrust force; and a pressure sensor for detecting the thrust force into which the torque is converted by the cam mechanism.

According to the torque detection device for the power steering, at the time of operation of the handle, a torque generated between the input shaft turned interlockedly with the handle and the output shaft turned interlockedly with the input shaft so as to steer the wheel or wheels is converted into a thrust force by the cam mechanism, and the thrust force is detected by the pressure sensor.

The torque can be detected as a result of the detection of the thrust force by the pressure sensor, and the assisting force to be exerted on the output shaft by the assisting unit can be determined based on the torque.

In addition, according to the torque detection device of an embodiment of the present invention, although the cam mechanism by which the torque generated between the input shaft and the output shaft is converted into the thrust force is needed, a planetary gear mechanism as needed in the device of Japanese Patent No. 2663454 is not needed. In addition, the arrangement of a sensing coil and a ring-shaped to-be-detected body provided with sensing slits or the like ranging along the circumferential direction that is needed in the device of Japanese Patent No. 4382623 is unnecessary. Accordingly, a complication in the structure can be prevented. Further, the torque detection device according to an embodiment of the present invention is less susceptible to influences of external factors or an influence of a bending force exerted on a shaft, since the torque detection is carried out through detection of the thrust force by the pressure sensor.

Thus, according to the torque detection device of an embodiment of the present invention, an effect can be obtained such that torque detection can be carried out without the complication of the structure and in the condition where the detection is less susceptible to influences of external factors or an influence of a bending force exerted on a shaft.

Desirably, the torque detection device for the power steering further includes a piston moved upon receiving the thrust force, and a cylinder defining a pressure chamber in which the piston and an incompressible fluid compressed by movement of the piston are contained, and the pressure sensor is composed of a pressure sensor for detecting the pressure of the incompressible fluid compressed as the piston is moved upon receiving the thrust force.

This configuration ensures that, since the pressure of the incompressible fluid in the pressure chamber is insusceptible to influences of disturbances (external factors), it is possible to achieve torque detection which is more insusceptible to influences of external factors. In addition, since torque detection can be carried out by detecting the pressure of the incompressible fluid arising from the thrust force produced as a result of conversion by the cam mechanism, lost motion can be reduced.

In the technology of detecting a torque amount on the basis of a torsion amount of a torsion bar described in Japanese Patent No. 2663454 and Japanese Patent No. 4382623, the torque amount cannot be detected unless the torsion bar undergoes a torsional deformation, and the torsion amount generates a lost motion.

On the other hand, according to the torque detection device of an embodiment of the present invention, although some lost motion is generated at the time of torque-to-thrust force conversion by the cam mechanism, no lost motion is generated in the incompressible fluid itself which is the object of direct detection. Accordingly, in the device as a whole, lost motion can be reduced as compared with those in the conventional devices.

The cylinder may be composed of a cylinder being concentric with the input shaft and the output shaft, being provided between outer peripheral portions of the input shaft and the output shaft and being ring-shaped as viewed in an axial direction. The piston may be composed of a piston being movably contained in the cylinder and being ring-shaped as viewed in the axial direction.

This configuration enables a torque detection part to be configured in a compact form around the input shaft and the output shaft.

The pressure chamber may be provided with a reservoir chamber for keeping constant the pressure in the pressure chamber when the input shaft is not turned.

This configuration ensures that pressure variations in the pressure chamber irrelevant to turning of the input shaft can be eliminated, and more accurate torque detection can be performed.

One of the input shaft and the output shaft may have an end portion configured as a cylindrical connection tube whereas the other shaft may have an end portion configured as a connection shaft fitted in the connection tube so as to be capable of mutual rotation about an axis line. The cam mechanism includes a cam groove provided in one of the connection tube and the connection shaft, and a cam follower being provided in the other of the connection tube and the connection shaft and being engaged with the groove. The connection tube and the connection shaft are connected to each other by the cam mechanism itself.

This configuration ensures that a joint part between the input shaft and the output shaft as well as the cam mechanism can be configured in compact form between the input shaft and the output shaft.

The cam grooves and the cam followers may be configured to be in point symmetry about a center of rotation as viewed in the axial direction of the connection tube and the connection shaft.

This configuration enables smooth conversion from torque to thrust force.

The cam follower may be composed of a pin which penetrates the connection tube and the connection shaft in a direction orthogonal to the axial direction of them, and the piston is moved by movement of both ends of the pin.

This configuration enables a detection part to be configured in compacter form.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(*a*) and 4(*b*) show views showing a cam mechanism, wherein 4(*a*) is a perspective view and 4(*b*) is a side view.

DETAILED DESCRIPTION OF THE PREFERRED EMBODIMENTS

An embodiment of the torque detection device for a power steering according to the present invention will be described below, referring to the drawings.

Figure 1:
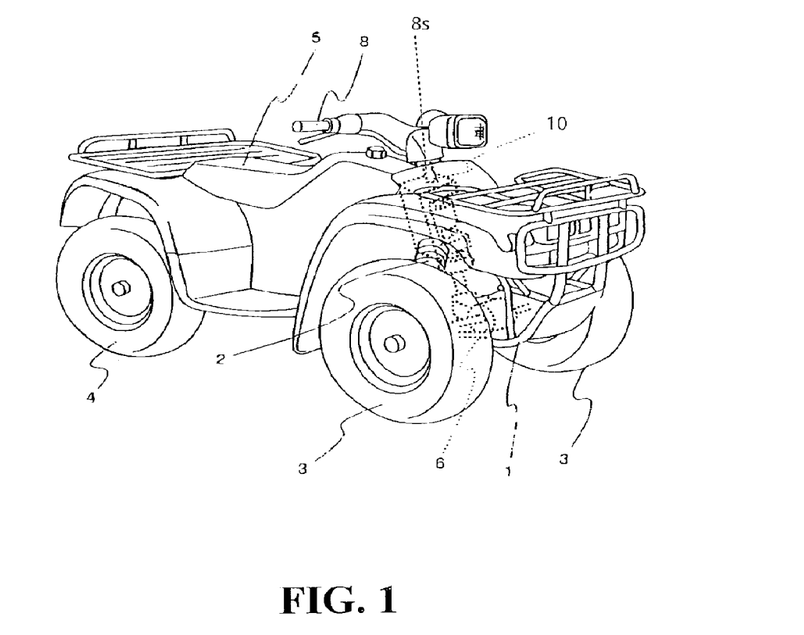
FIG. 1 is a perspective view of a four-wheel buggy as an example of a vehicle based on adoption of an embodiment of the torque detection device for a power steering according to the present invention.

FIG. 1 is a perspective view showing a four-wheel buggy as an example of a vehicle based on adoption of an embodiment of the torque detection device for a power steering according to an embodiment of the present invention.

The four-wheel buggy shown in FIG. 1 includes a body frame 1, a suspension system 2 connected at it base portion to the body frame 1, a pair of front wheels 3 and a pair of rear wheels 4 which are supported by the suspension system 2 and the body frame 1. An engine unit (not shown) is connected to the rear wheel 4 through a transmission mechanism (not shown) and is provided with a speed reduction mechanism (not shown). A seat 5 is provided on which the driver is seated in a straddling manner with a power steering 10 supported on the body frame 1 and connected to the front wheel 3 through a transmission mechanism 6. A handle bar 8 is provided at a top portion of the power steering 10. The four-wheel buggy can be made to operate by handle operations, throttle operation, gear operations and the like conducted by the driver who sits on the seat 5.

Figure 2:
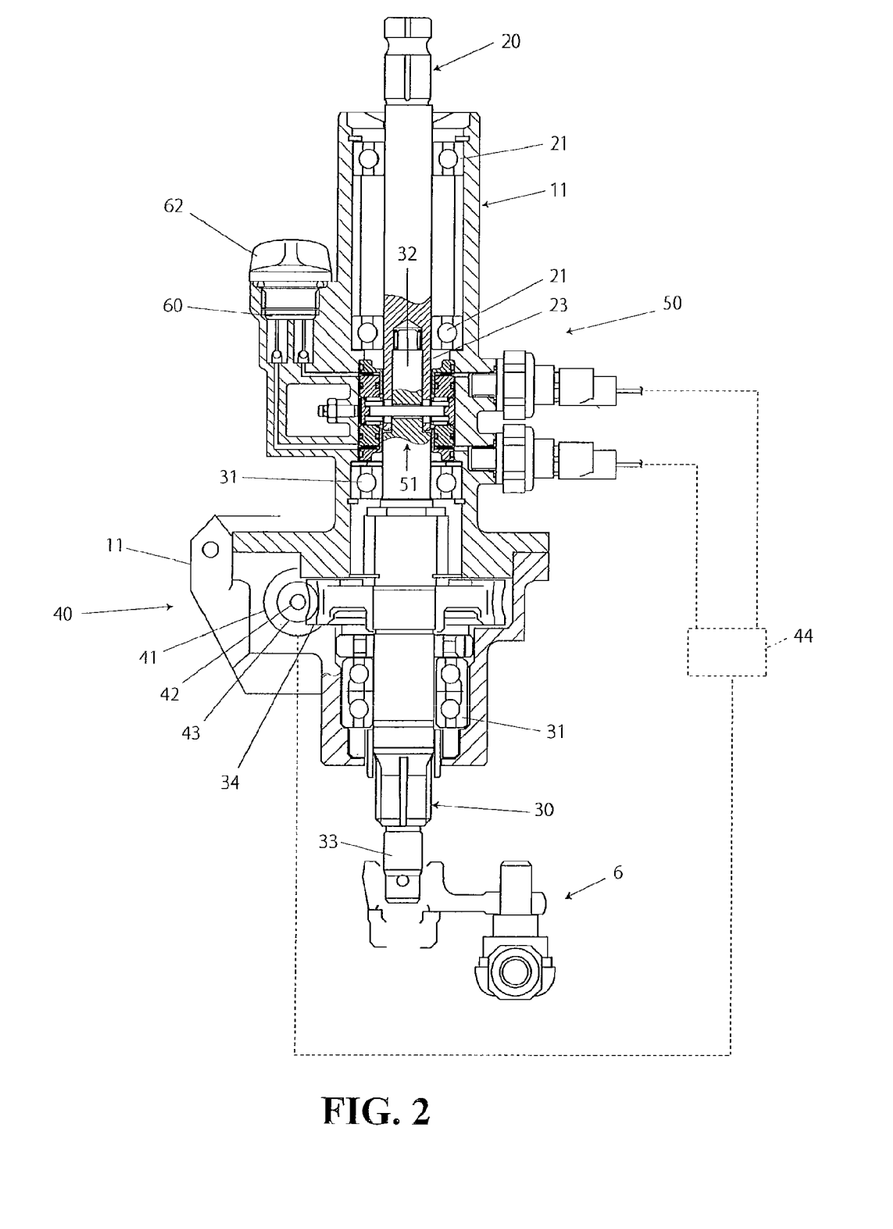
FIG. 2 is a longitudinal sectional view showing a power steering 10.

FIG. 2 is a longitudinal sectional view showing the power steering 10.

The power steering 10 includes an input shaft 20 turned interlockedly with the handle bar 8 (see FIG. 1) for operating the traveling direction of the vehicle, an output shaft 30 turned interlockedly with the input shaft 20 so as to steer the wheels (in this case, the front wheels 3), and a torque detection device 50 which detects a torque generated between the input shaft 20 and the output shaft 30 and by which an assisting force to be exerted on the output shaft 30 by an assisting unit 40 is determined based on the detection result.

The input shaft 20 is rotatably borne on a case 11 through bearing members 21, 21. The case 11 is fixed to the body frame 1. The lower end of a steering shaft 8s (FIG. 1) of the handle bar 8 is connected to the upper end 22 of the input shaft 20. Therefore, when an operation of turning the handle bar 8 is conducted, the input shaft 20 is turned accordingly.

The output shaft 30 is rotatably borne on the case 11 through bearing members 31, 31. An upper end portion 32 of the output shaft 30 is connected to a lower end portion 23 of the input shaft 20 through a connection part (which is also a cam mechanism) 51 to be described later, and a lower end portion 33 of the output shaft 30 is connected to an interlocking mechanism 6 for steering the front wheels 3, 3. Therefore, when an operation of turning the handle bar 8 is conducted and the input shaft 20 is turned thereby, the output shaft 30 is turned accordingly, and the front wheels 3, 3 are steered through the interlocking mechanism 6 (see FIG. 1).

The assisting unit 40 is incorporated in the case 11, and includes an electric motor 41, and a worm 43 fixed to a rotating shaft 42 of the electric motor 41, the worm 43 being meshed with a worm wheel 34 which is fixed to the output shaft 30. Therefore, as the electric motor 41 is driven, an assisting force is exerted on the output shaft 30.

The assisting force to be exerted by the electric motor 41 is determined by an electronic control unit 44. The electronic control unit 44 is a controller which is mounted in an appropriate place on the vehicle and which performs electronic control of an engine and the like. The electric motor 41 and the torque detection device 50 are electrically connected to the electronic control unit 44 respectively. When a detection signal relevant to detection by the torque detection device 50 is inputted to the electronic control unit 44, the electronic control unit 44 determines a driving signal for the electric motor 41 (a driving force of the electric motor 41), based on the detection signal, and the electric motor 41 is driven based on the driving signal. Consequently, an assisting force according to the signal of detection by the torque detection device 50 is exerted on the output shaft 30.

Figure 3:
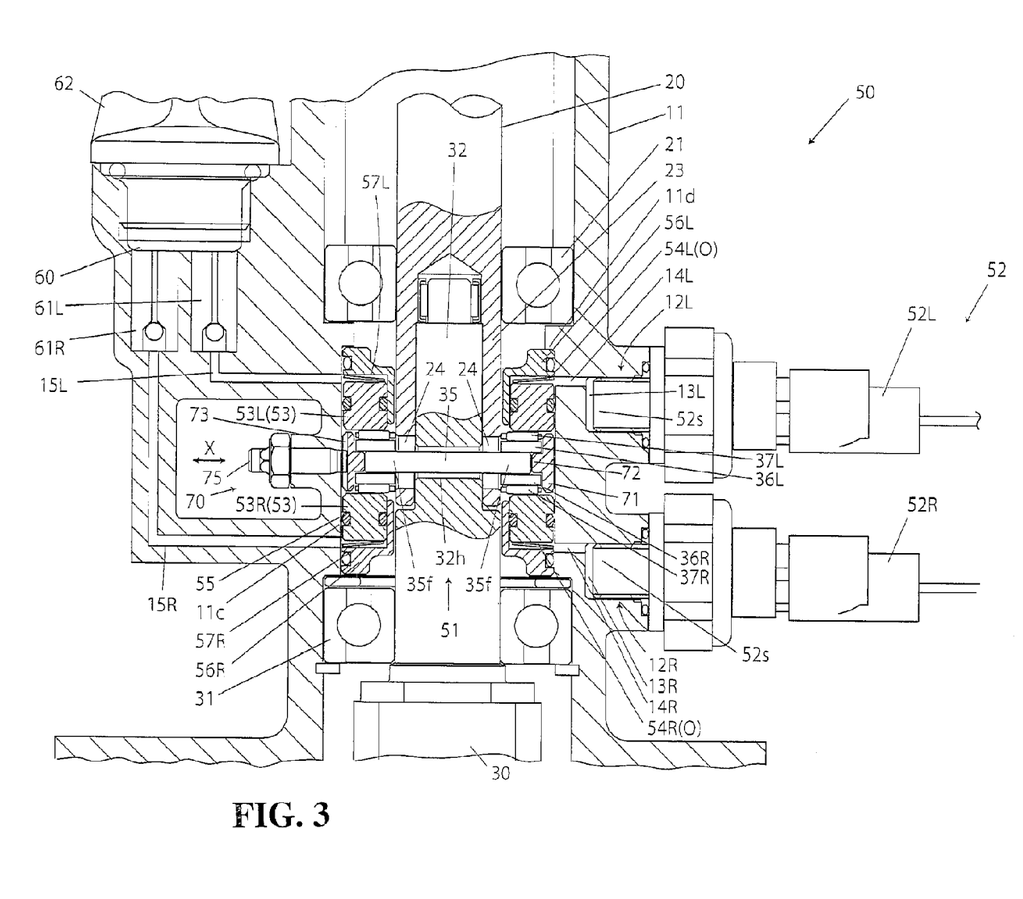
FIG. 3 is an enlarged view of a part of FIG. 2, showing an essential part of a torque detection device 50.
Figure 4A:
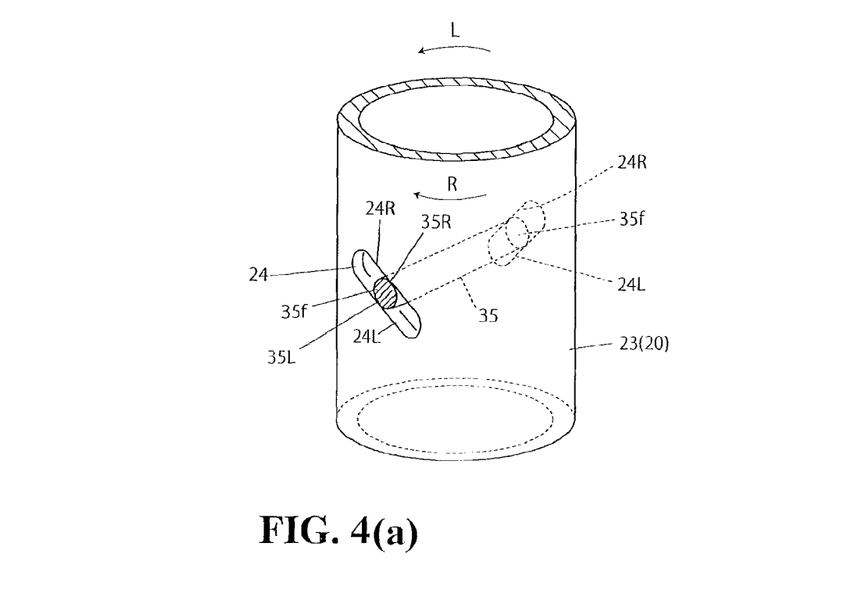
Figure 4B:
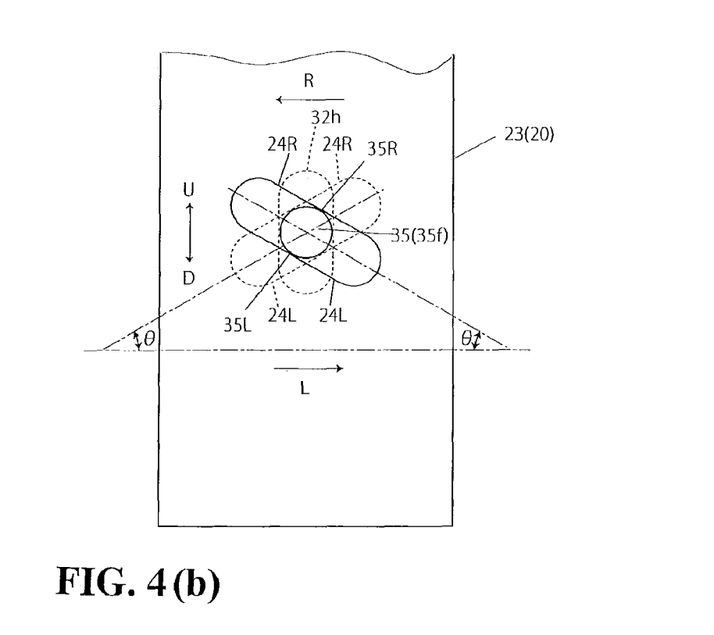

FIG. 3 is an enlarged view of a part of FIG. 2, showing an essential part of the torque detection device 50. FIGS. 4(a) and 4(b) show views showing a cam mechanism, wherein 4(a) is a perspective view and 4(b) is a side view.

The torque detection device 50 includes a cam mechanism 51 which is provided between the input shaft 20 and the output shaft 30 and by which a torque generated between the input shaft 20 and the output shaft 30 is converted into a thrust force. A pressure sensor 52 is provided for detecting the thrust force produced upon the conversion by the cam mechanism 51.

The cam mechanism 51 in this embodiment has a configuration wherein the lower end portion 23 of the input shaft 20 is configured as a cylindrical connection tube (23), whereas the upper end portion 32 of the output shaft 30 is configured as a connection shaft (32) fitted in the connection tube 23 so as to be capable of relative rotation about an axis line. The cam mechanism 51 has cam grooves 24 provided in the connection tube 23, and a cam follower 35 provided on the connection shaft 32 and engaged with the cam grooves 24, with the connection tube 23 and the connection shaft 32 being connected to each other through the cam mechanism 51 itself.

The cam grooves 24 are composed of a pair of track holes (slots) provided in the connection tube 23. The cam grooves 24 are provided in point symmetry about a center of rotation as viewed in the axial direction of the connection tube 23. In addition, as shown in FIG. 4(b), each of the cam grooves 24 is inclined against the axial direction of the connection tube 23, as viewed in a direction orthogonal to the axial direction of the connection tube 23. The inclination angle θ relating to the rotating direction (arrow R or L) of the connection tube is the same for both of the cam grooves.

The cam follower 35 is composed of a pin (35) which penetrates the connection tube 23 and the connection shaft 32 in a direction orthogonal to the axially direction.

The connection shaft 32 is provided with a through-hole 32h. As shown in FIGS. 3 and 4(b), the through-hole 32h is composed of a track hole (slot) extending in the axial direction of the connection shaft 32 (in the vertical direction in FIG. 4(b)) as viewed in the axial direction of the pin 35. The pin 35 is inserted in and passed through the through-hole 32h.

Therefore, the pin 35 can be moved along the through-hole 32h in the axial direction of the connection shaft 32 (in the vertical direction in FIG. 4(b)).

In addition, the pin 35 is inserted in and passed through the pair of cam grooves 24 provided in the connection tube 23. Both ends of the pin 35 protrude from the connection shaft 32, and the protruding ends 35f, 35f constitute a cam follower engaged with the cam grooves 24.

The cam grooves 24 and the cam followers 35f are in point symmetry about the center of rotation, as viewed in the axial direction of the connection tube 23 and the connection shaft 32.

The operation of the cam mechanism 51 is as follows.

When the handle bar 8 shown in FIG. 1 is steered to the right (clockwise) and the connection tube 23 of the input shaft 20 is turned in the direction of arrow R in FIGS. 4(a) and 4(b), the upper-side cam surfaces 24R of the cam grooves 24 make contact with upper portions 35R of the cam follower 35f, and press the cam follower 35f to the lower side D. Consequently, the torque turning the input shaft 20 in the direction R is converted into a thrust force for pressing the cam follower 35f down.

On the other hand, when the handle bar 8 shown in FIG. 1 is steered to the left (counterclockwise) and the connection tube 23 of the input shaft 20 is turned in the direction of arrow L in FIGS. 4(a) and 4(b), the lower-side cam surfaces 24L of the cam grooves 24 make contact with lower portions 35L of the cam follower 35f, and press the cam follower 35f to the upper side U. As a result, the torque turning the input shaft 20 in the direction L is converted into a thrust force for pressing the cam follower 35f up.

As for detection of the thrust force produced upon conversion by the cam mechanism 51, the thrust force acting on the cam follower 35f can be detected directly. In this embodiment, however, the detection is made by use of a detection means with an incompressible fluid (for example, a liquid, desirably an oil) as a medium, as will be described next.

The torque detection device 50 further includes pistons 53 moved upon receiving the thrust force, and a cylinder 55 for defining pressure chambers 54 each containing the piston 53 and an oil O as an incompressible fluid to be compressed by movement of the piston 53. The pressure sensor 52 is composed of a pressure sensor (oil pressure sensor) for detecting the pressure of the incompressible fluid (oil) 0 compressed by the piston 53 moved upon receiving the thrust force.

The cylinder 55 is composed of a cylinder being ring-shaped as viewed in the axial direction, being concentric with the input shaft 20 and the output shaft 30, and being provided at upper peripheral portions of the input shaft 20 and the output shaft 30 (in this embodiment, at an outer peripheral portion of the connection tube 23). The piston 53 is composed of a piston being ring-shaped as viewed in the axial direction and being movably contained in the cylinder 55.

The cylinder 55 can be composed of an inner peripheral wall 11c of the case 11, and a pair of upper and lower stepped tubular members 56L, 56R contained in the case 11.

In this embodiment, a pair of upper and lower pistons 53 are provided. The upper piston 53L is contained in a space between the inner peripheral wall 11c of the case 11 and the upper stepped tubular member 56L, and the lower piston 53R is contained in a space between the inner peripheral wall 11c of the case 11 and the lower stepped tubular member 56R.

The upper stepped tubular member 56L is positioned by abutment of its upper surface on a stepped part 11d provided at the inner peripheral wall 11c of the case 11, whereas the lower stepped tubular member 56R is positioned by contact of its lower portion with the bearing member 31 for the output shaft 30.

Both ends 35f of the pin 35 penetrate through the cam grooves 24, to protrude to the outside of the connection tube 23. The protruding parts (both ends 35f) abut on the lower surface of the upper piston 53L through a ring-shaped collar 36L and a thrust bearing 37L on the upper side, and abut on the upper surface of the lower piston 53R through a ring-shaped collar 36R and a thrust bearing 37R on the lower side.

A Belleville spring 57L for biasing the upper piston 53L toward the pin 35 is provided between the upper stepped tubular member 56L and the upper piston 53L, and a Belleville spring 57R for biasing the lower piston 53R toward the pin 35 is provided between the lower stepped tubular member 56R and the lower piston 53R.

Therefore, the upper piston 53L, the thrust bearing 37L, the collar 36L, the pin 35, the collar 36R, the thrust bearing 37R, and the piston 53R are kept in mutual contact without chattering (without play), by the biasing action of the Belleville springs 57L, 57R.

Consequently, the above-mentioned vertical movement of the cam followers 35f, or the pin 35, is transmitted to the pistons 53L, 53R without play. In other words, a movement of both ends 35f of the pin 35 in the vertical direction (in the axial direction of the pistons 53) causes a movement of the pistons 53L, 53R in the vertical direction.

The movement of the pistons 53L, 53R varies the pressures in the pressure chambers 54 (L, R), namely, the pressure of the oil O.

The upper piston 53L is a piston for detection of the torque when the handle bar 8 is steered to the left (counterclockwise), while the lower piston 53R is a piston for detection of the torque when the handle bar 8 is steered to the right (clockwise). In the present specification, therefore, the upper piston 53L is called also as a leftward steering detection piston, and the lower piston 53R as a rightward steering detection piston.

The pressure chambers 54 in this embodiment include a ring-shaped leftward steering detection pressure chamber 54L formed between the leftward steering detection piston 53L and the stepped tubular member 56L, and a ring-shaped rightward steering detection pressure chamber 54R formed between the rightward steering detection piston 53R and the stepped tubular member 56R.

In the manner of corresponding to the pressure chambers 54L, 54R, the pressure sensors 52 include a leftward steering detection pressure sensor 52L and a rightward steering detection pressure sensor 52R. The pressure sensors 52L, 52R are mounted to mount parts 12L, 12R formed as parts of the case 11, respectively.

The mount parts 12L, 12R are provided with pressure receiving chambers 13L, 13R respectively, and pressure detection parts 52s of the sensors are fronting on the pressure receiving chambers 13L, 13R.

The pressure receiving chamber 13L communicates with the pressure chamber 54L through a communication passage 14L formed in the case 11, while the pressure receiving chamber 13R communicates with the pressure chamber 54R through a communication passage 14R formed in the case 11.

Therefore, a pressure variation in the pressure chamber 54L is detected by the pressure sensor 52L through the communication passage 14L and the pressure receiving chamber 13L, while a pressure variation in the pressure chamber 54R is detected by the pressure sensor 52L through the communication passage 14R and the pressure receiving chamber 13R.

The pressure chambers 54L, 54R are provided with a reservoir chamber 60 for keeping constant the pressures in the pressure chambers 54L, 54R when the input shaft 20 is not turned.

The pressure chambers 54L, 54R are connected to the reservoir chamber 60 respectively through the communication passages 15L, 15R formed in the case 11 and check ball valves 61L, 61R for oil pressure lock which are incorporated in the case 11. A cap 62 is provided for the reservoir chamber.

In this embodiment, a neutrality adjusting mechanism 70 is provided for the pin 35.

The neutrality adjusting mechanism 70 is a mechanism by which the amount of protrusion from cam groove of both end portions 35f of the pin 35 which protrude from the cam grooves 24L, 24R are made to be equal on the left and right sides, whereby the pressing forces exerted on the pistons 53 (L, R) by the end portions 35f are equalized, thereby smoothening the movement of the pistons 53 (L, R).

The neutrality adjusting mechanism 70 has a positioning ring 71 being contained in the case 11 and being movable in a radial direction (in the left-right direction in FIG. 3 (the axial direction of the pin 35)), and an adjusting screw 75 for adjusting the position of the positioning ring 71 and thereby adjusting the protrusion amounts of both end portions 35f of the pin 35.

The adjusting screw 75 is rotatably mounted to the case 11.

The positioning ring 71 is provided at its inner peripheral surface with a ring-shaped projection (linear projection) 72 projecting inward, and the inner peripheral surface of the linear projection 72 is in contact with both end faces of the pin 35.

The outer peripheral surface of the positioning ring 71 facing the adjusting screw 75 is provided with a recessed groove 73 extending in the axial direction (the vertical direction in FIG. 3). The tip of the adjusting screw 75 is engaged with the recessed groove 73 so as to be capable of relative movement along the recessed groove 73.

Therefore, when the adjusting screw 75 is rotated and thereby moved in the axial direction (the direction of arrow X), the positioning ring 71 is also moved in the same direction, whereby the pin 35 is also moved, and the protrusion amounts of both end portions 35f of the pin 35 can be thereby adjusted.

Operation of the torque detection device 50 for a power steering as above-described is as follows.

At the time of steering to the right:

When the handle bar 8 shown in FIG. 1 is steered to the right, the connection tube 23 of the input shaft 20 is turned in the direction of arrow R in FIG. 4, so that the upper-side cam surfaces 24R, 24R of the cam grooves 24, 24 make contact with the upper portions 35R, 35R of the cam followers 35f, 35f, whereby the cam followers 35f, 35f are pressed to the lower side D by a thrust force according to the turning torque of the handle bar 8.

As a result, the rightward steering detection piston 53R is moved downward, the oil O in the pressure chamber 54R is compressed, and the compressive force is detected by the pressure sensor 52R through the communication passage 14R and the pressure receiving chamber 13R. Here, the compressive force thus detected has a magnitude corresponding to the thrust force according to the turning torque of the handle bar 8.

The detection result (detection signal) upon detection by the pressure sensor 52R is outputted to the electronic control unit 44. The electronic control unit 44 determines a driving force for the electric motor 41 (assisting force) according to the detection result, and outputs the driving signal to the electric motor 41 so as to drive the electric motor 41.

As a result, an assisting force according to the turning torque of the handle bar 8 is exerted on the output shaft 30, and the front wheels 3, 3 are steered through the interlocking mechanism 6.

At the time of steering to the left:

When the handle bar 8 shown in FIG. 1 is steered to the left, the connection tube 23 of the input shaft 20 is turned in the direction of L in FIG. 4, so that the lower-side cam surfaces 24L, 24L of the cam grooves 24, 24 make contact with the lower portions 35L, 35L of the cam followers 35f, 35f, whereby the cam followers 35f, 35f are pressed to the upper side U by a thrust force according to the turning torque of the handle bar 8.

As a result, the leftward steering detection piston 53L is moved upward, the oil O in the pressure chamber 54L is compressed, and the compressive force is detected by the pressure sensor 52L through the communication passage 14L and the pressure receiving chamber 13L. Here, the compressive force thus detected has a magnitude corresponding to the thrust force according to the turning torque of the handle bar 8.

The detection result upon detection by the pressure sensor 52L (detection signal) is outputted to the electronic control unit 44. The electronic control unit 44 determines a driving force for the electric motor 41 (assisting force) according to the detection result, and outputs the driving signal to the electric motor 41 so as to drive the electric motor 41.

Consequently, an assisting force according to the turning torque of the handle bar 8 is exerted on the output shaft 30, and the front wheels 3, 3 are steered through the interlocking mechanism 6.

According to the torque detection device 50 for a power steering as above-described, the following effects can be obtained.

According to the present torque detection device 50 for a power steering, at the time of a handle bar operation, a torque generated between the input shaft 20 turned interlockedly with the handle bar 8 and the output shaft 30 turned interlockedly with the input shaft 20 so as to steer the wheels 3, 3 is converted into a thrust force by the cam mechanism 51, and the thrust force is detected by the pressure sensor 52.

With the thrust force detected by the pressure sensor 52, the torque can consequently be detected, and the assisting force to be applied to the output shaft 30 by the assisting unit 40 can be determined based on the torque.

According to the present torque detection device 50, although the cam mechanism 51 for converting the torque generated between the input shaft 20 and the output shaft 30 into the thrust force is needed, a planetary gear mechanism as needed in the device of Japanese Patent No. 2663454 is not needed. In addition, the arrangement of a sensing coil and a ring-shaped to-be-detected body provided with sensing slits or the like ranging along the circumferential direction as needed in the device of Japanese Patent No. 4382623 is not necessary. Accordingly, a complication in the structure can be prevented.

In addition, since the torque detection device 50 detects a torque through detection of a thrust force by the pressure sensor 52, the detection is less susceptible to influences of external factors or an influence of a bending force exerted on the shaft.

(b) The torque detection device further includes the pistons 53 moved upon receiving a thrust force, and the cylinder 55 defining the pressure chamber 54 each containing the piston 53 and the incompressible fluid compressed by movement of the piston 53, and the pressure sensor 52 is composed of a pressure sensor for detecting the pressure of the incompressible fluid compressed by the piston 53 moved upon receiving a thrust force. Therefore, since the pressure of the incompressible fluid in the pressure chambers 54 is less susceptible to influences of disturbances (external factors), it is possible to achieve detection which is further insusceptible to influences of external factors. In addition, since torque detection can be made by detection of the pressure of the incompressible fluid arising from the thrust force produced upon conversion by the cam mechanism 51, lost motion can be reduced.

According to the present torque detection device 50, although a little lost motion arising from a little gap or slip between the cam mechanism 24 and the pin 35 may be generated at the time of torque-to-thrust force conversion by the cam mechanism 51, no lost motion is generated in the incompressible fluid itself which is the object of direct detection. Accordingly, in the device 50 as a whole, the lost motion can be reduced as compared with those in the conventional devices.

(c) The cylinder 55 is composed of the ring-shaped cylinder being ring-shaped as viewed in the axial direction, being concentric with the input shaft 20 and the output shaft 30 and being provided at outer peripheral portions of the input shaft 20 and the output shaft 30, and the pistons 53 are composed of pistons being ring-shaped as viewed in the axial direction and being movably contained in the cylinder 55. Therefore, the torque detection part can be configured in a compact form around the input shaft 20 and the output shaft 30.

(d) Since the pressure chambers 54 are provided with the reservoir chamber 60 for keeping constant the pressures in the pressure chambers 54 when the input shaft 20 is not turned, pressure variations in the pressure chambers 54 irrelevant to turning of the input shaft 20 are eliminated, whereby more accurate torque detection can be performed.

(e) One of the input shaft 20 and the output shaft 30 has an end portion configured as the cylindrical connection tube 23, whereas the other shaft has an end portion configured as the connection shaft 32 fitted in the connection tube 23 so as to be capable of relative rotation about the axial line. In addition, the cam mechanism 51 includes the cam grooves 24 provided in one of the connection tube 23 and the connection shaft 32, and the cam followers 35f provided in the other so as to be engaged with the cam grooves 24, and the connection tube 23 and the connection shaft 32 are connected to each other by the cam mechanism 51 itself. Therefore, the joint part between the input shaft 20 and the output shaft 30 and the cam mechanism can be configured in a compact form between the shafts.

(f) Since the cam grooves 51 and the cam followers 35f are in point symmetry about the center of rotation as viewed in the axial direction of the connection tube 23 and the connection shaft 32, the torque-to-thrust force conversion can be performed smoothly.

(g) Since the cam follower 35f is composed of the pin 35 penetrating the connection tube 23 and the connection shaft 32 in a direction orthogonal to the axial direction of them and the pistons 53 are moved by movement of both ends of the pin 35, the detection part can be configured in compacter form.

While an embodiment of the present invention has been described above, the invention is not limited to the embodiment, and modifications can be appropriately made within the scope of the gist of the invention.

For instance, while the invention has been applied to the power steering of a four-wheel buggy in the above embodiment, it is applicable also to the power steering of other vehicles, and applicable also to the power steering provided with wheels operated by a handle bar.

In addition, the cam mechanism 51 in the above embodiment has a configuration in which the lower end portion 23 of the input shaft 20 is configured as a cylindrical connection tube (23), the upper end portion 32 of the output shaft 30 is configured as the connection shaft (32) fitted in the connection tube 23 so as to be capable of relative rotation about the axis line with the cam mechanism 51 including the cam grooves 24 provided in the connection tube 23. The cam followers 34 are provided in the connection shaft 32 so as to be engaged with the grooves 24. The connection tube 23 and the connection shaft 32 are connected to each other by the cam mechanism 51 itself. However, another configuration may be adopted in which an upper end portion of the output shaft 30 is configured as a cylindrical connection tube, and a lower end portion of the input shaft 20 is configured as a connection shaft fitted in the connection tube so as to be capable of relative rotation about the axis line. The cam mechanism may include cam grooves provided in the connection shaft, and cam followers provided in the connection tube so as to be engaged with the cam grooves. The connection tube and the connection shaft may be connected to each other by the cam mechanism itself. In this case, the cam followers can be configured by projections projecting at the inner surface of the connection tube to be engaged with the cam grooves.

Further, while the piston 53 has been composed of two pistons 53 (L, R) interlocked with the pin 35 in the above embodiment, the piston 53 may be composed of a single piston interlocked with the pin 35.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque detection device for a power steering, operable to detect a torque generated between an input shaft, which is turned interlockedly with a steering handle bar for operating a traveling direction of a vehicle, and an output shaft turned interlockedly with the input shaft so as to steer a wheel, the detection result being used to determine, on the basis thereof, an assisting force to be exerted on the output shaft by an assisting unit, wherein the torque detection device comprises:
a cam mechanism which is provided between the input shaft and the output shaft and by which the torque generated between the input shaft and the output shaft is converted into a thrust force; and
a pressure sensor for detecting the thrust force into which the torque is converted by the cam mechanism.

2. The torque detection device for the power steering according to claim 1, further comprising a piston moved upon receiving the thrust force, and a cylinder defining a pressure chamber in which the piston and an incompressible fluid compressed by movement of the piston are contained, wherein the pressure sensor is composed of a pressure sensor for detecting the pressure of the incompressible fluid compressed by the piston moved upon receiving the thrust force.

3. The torque detection device for the power steering according to claim 2, wherein the cylinder is composed of a cylinder being concentric with the input shaft and the output shaft, being provided between outer peripheral portions of the input shaft and the output shaft and being ring-shaped as viewed in an axial direction, and the piston is composed of a piston being movably contained in the cylinder and being ring-shaped as viewed in the axial direction.

4. The torque detection device for the power steering according to claim 2, wherein the pressure chamber is provided with a reservoir chamber for keeping constant the pressure in the pressure chamber when the input shaft is not turned.

5. The torque detection device for the power steering according to claim 3, wherein the pressure chamber is provided with a reservoir chamber for keeping constant the pressure in the pressure chamber when the input shaft is not turned.

6. The torque detection device for the power steering according to claim 1, wherein one of the input shaft and the output shaft has an end portion configured as a cylindrical connection tube; whereas the other shaft has an end portion configured as a connection shaft fitted in the connection tube so as to be capable of mutual rotation about an axis line; the cam mechanism comprises a cam groove provided in one of the connection tube and the connection shaft, and a cam follower being provided in the other of the connection tube and the connection shaft and being engaged with the groove; and the connection tube and the connection shaft are connected to each other by the cam mechanism itself.

7. The torque detection device for the power steering according to claim 2, wherein one of the input shaft and the output shaft has an end portion configured as a cylindrical connection tube; whereas the other shaft has an end portion configured as a connection shaft fitted in the connection tube so as to be capable of mutual rotation about an axis line; the cam mechanism comprises a cam groove provided in one of the connection tube and the connection shaft, and a cam follower being provided in the other of the connection tube and the connection shaft and being engaged with the groove; and the connection tube and the connection shaft are connected to each other by the cam mechanism itself.

8. The torque detection device for the power steering according to claim 3, wherein one of the input shaft and the output shaft has an end portion configured as a cylindrical connection tube; whereas the other shaft has an end portion configured as a connection shaft fitted in the connection tube so as to be capable of mutual rotation about an axis line; the cam mechanism comprises a cam groove provided in one of the connection tube and the connection shaft, and a cam follower being provided in the other of the connection tube and the connection shaft and being engaged with the groove; and the connection tube and the connection shaft are connected to each other by the cam mechanism itself.

9. The torque detection device for the power steering according to claim 6, wherein the cam grooves and the cam followers are configured to be in point symmetry about a center of rotation as viewed in the axial direction of the connection tube and the connection shaft.

10. The torque detection device for the power steering according to claim 6, wherein the cam follower is composed of a pin which penetrates the connection tube and the connection shaft in a direction orthogonal to the axial direction of the connection tube and the connection shaft, and the piston is moved by movement of both ends of the pin.

11. A torque detection device for a power steering comprising:
an input shaft turnable interlockedly with a steering handle bar for operating a traveling direction of a vehicle;
an output shaft turnable interlockedly with the input shaft for steering the vehicle;

said torque detection device being operable to detect a torque generated between the input shaft and the output shaft;

a cam mechanism operatively positioned between the input shaft and the output shaft wherein the torque generated between the input shaft and the output shaft is converted into a thrust force; and a pressure sensor for detecting the thrust force into which the torque is converted by the cam mechanism;

wherein a detection result is used to determine an assisting force to be exerted on the output shaft by an assisting unit.

12. The torque detection device for the power steering according to claim 11, further comprising a piston moved upon receiving the thrust force, and a cylinder defining a pressure chamber in which the piston and an incompressible fluid compressed by movement of the piston are contained, wherein the pressure sensor is composed of a pressure sensor for detecting the pressure of the incompressible fluid compressed by the piston moved upon receiving the thrust force.

13. The torque detection device for the power steering according to claim 12, wherein the cylinder is composed of a cylinder being concentric with the input shaft and the output shaft, being provided between outer peripheral portions of the input shaft and the output shaft and being ring-shaped as viewed in an axial direction, and the piston is composed of a piston being movably contained in the cylinder and being ring-shaped as viewed in the axial direction.

14. The torque detection device for the power steering according to claim 12, wherein the pressure chamber is provided with a reservoir chamber for keeping constant the pressure in the pressure chamber when the input shaft is not turned.

15. The torque detection device for the power steering according to claim 13, wherein the pressure chamber is provided with a reservoir chamber for keeping constant the pressure in the pressure chamber when the input shaft is not turned.

16. The torque detection device for the power steering according to claim 11, wherein one of the input shaft and the output shaft has an end portion configured as a cylindrical connection tube; whereas the other shaft has an end portion configured as a connection shaft fitted in the connection tube so as to be capable of mutual rotation about an axis line; the cam mechanism comprises a cam groove provided in one of the connection tube and the connection shaft, and a cam follower being provided in the other of the connection tube and the connection shaft and being engaged with the groove; and the connection tube and the connection shaft are connected to each other by the cam mechanism itself.

17. The torque detection device for the power steering according to claim 12, wherein one of the input shaft and the output shaft has an end portion configured as a cylindrical connection tube; whereas the other shaft has an end portion configured as a connection shaft fitted in the connection tube so as to be capable of mutual rotation about an axis line; the cam mechanism comprises a cam groove provided in one of the connection tube and the connection shaft, and a cam follower being provided in the other of the connection tube and the connection shaft and being engaged with the groove; and the connection tube and the connection shaft are connected to each other by the cam mechanism itself.

18. The torque detection device for the power steering according to claim 13, wherein one of the input shaft and the output shaft has an end portion configured as a cylindrical connection tube; whereas the other shaft has an end portion configured as a connection shaft fitted in the connection tube so as to be capable of mutual rotation about an axis line; the cam mechanism comprises a cam groove provided in one of the connection tube and the connection shaft, and a cam follower being provided in the other of the connection tube and the connection shaft and being engaged with the groove; and the connection tube and the connection shaft are connected to each other by the cam mechanism itself.

19. The torque detection device for the power steering according to claim 16, wherein the cam grooves and the cam followers are configured to be in point symmetry about a center of rotation as viewed in the axial direction of the connection tube and the connection shaft.

20. The torque detection device for the power steering according to claim 16, wherein the cam follower is composed of a pin which penetrates the connection tube and the connection shaft in a direction orthogonal to the axial direction of the connection tube and the connection shaft, and the piston is moved by movement of both ends of the pin.

* * * * *